Feb. 21, 1933.  H. W. TAYLOR  1,898,226
VALVE STRUCTURE
Filed April 27, 1928
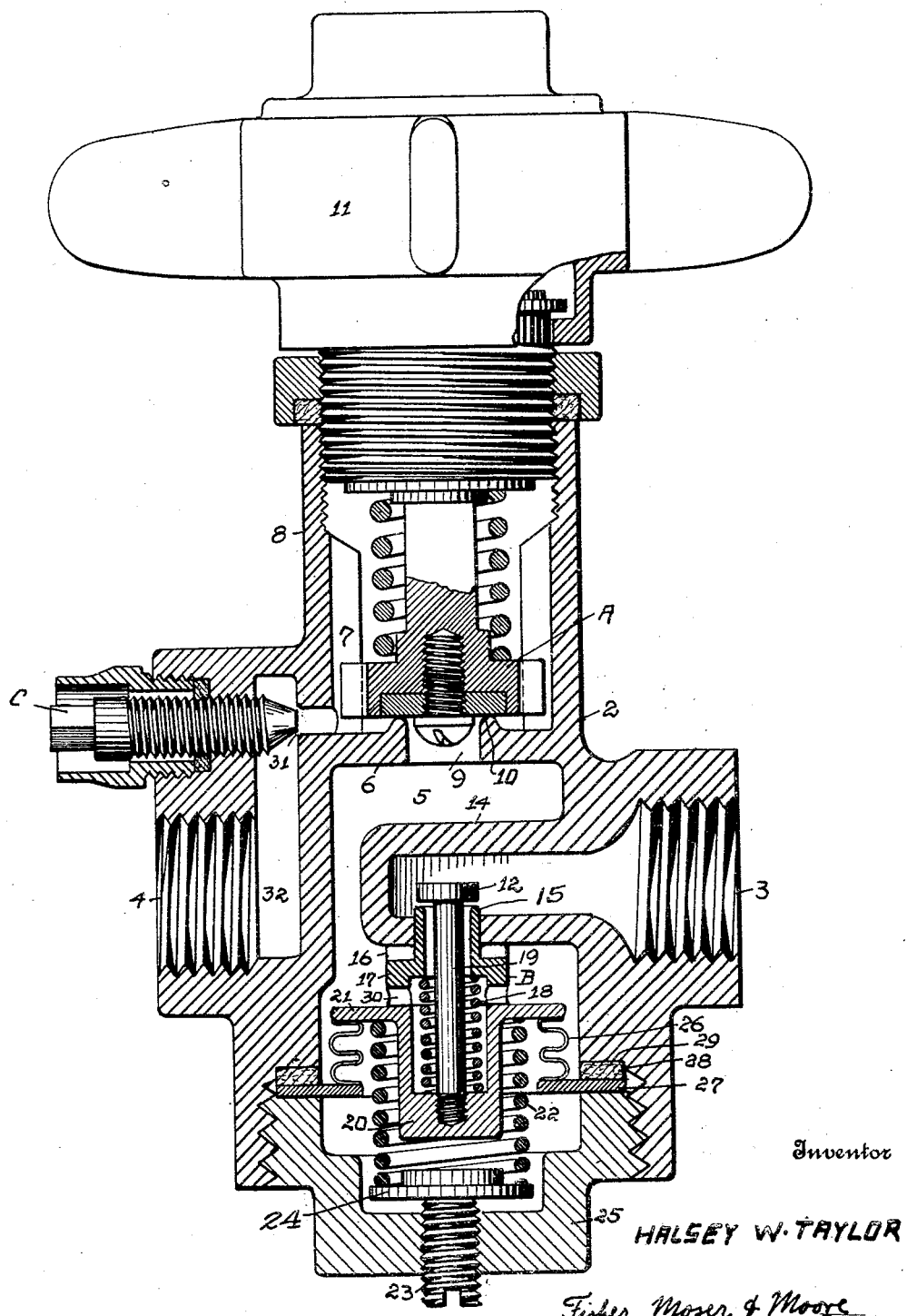
Inventor
HALSEY W. TAYLOR
Fisher, Moser & Moore
Attorney Patented Feb. 21, 1933

1,898,226

UNITED STATES PATENT OFFICE

HALSEY W. TAYLOR, OF WARREN, OHIO

VALVE STRUCTURE

Application filed April 27, 1928. Serial No. 273,240.

This invention relates to an improvement in regulating valves, the object in general being to provide a simple compact device to manually control and automatically regulate the flow of a liquid which is subject to change in pressure. For example, water supplied from city service pipes and projected from a drinking fountain in a jet or stream is subject to changes in pressure, and it is difficult to maintain the drinking jet or column at a uniform height or in a predetermined shape and form when a valve is opened fully and the water released suddenly. In the present device a main valve is operated manually to control the discharge of water in general, and a supplemental valve is embodied in the same body to automatically diminish the flow of water passing through the main valve when a predetermined pressure in the line is exceeded. A third valve is also incorporated in the device to effect a back pressure and determine the volume of water to be discharged from the device when the main and supplemental valves are fully open. As constructed, each one of the valves may be removed independently and the chambered interior of the body and the valve seats are conveniently accessible. Also, each valve may be conveniently reached and manipulated, or set and adjusted, from the outside of the body without removing or detaching any part of the device.

In the accompanying drawing, the single figure is a sectional view of the device on an enlarged scale, which device comprises a cast metal body 2 having a screw-threaded intake passage 3 on one side and a screw-threaded outlet or discharge passage 4 on its opposite side. The lower or main part of body 2 contains an expansion chamber 5 which is separated by a diaphragm or cross wall 6 from a receiving compartment 7 located in vertical extension 8 of the body. A communicating passage 9 for the said chambers is formed in cross wall 6, and a valve seat 10 is provided at the top thereof for a main valve A. Preferably, a spring-pressed self-closing valve having a rotatable handle 11 of the kind exemplified in my application for patent, Serial No. 123,296, filed July 19, 1926, is secured to and arranged to operate within extension 8, but any suitable valve assembly of the same class, or of another type, say of the quick compression type, may be used instead to open and close the main valve passage 9.

The flow of water from intake 3 to chamber 5 is controlled or regulated automatically by a pressure valve B, the head or closure member 12 of which is confined within a hollow extension or walled branch 14 at the inner end of intake passage 3. A tubular nipple or valve seat 15 projects upwardly through the bottom wall of the inwardly extending branch 14, and a sealing washer 16 is interposed between said wall and the enlarged base portion 17 of this nipple which is pressed upwardly at all times to its seat by a small compression spring 18.

The reduced stem 19 of valve member 12 extends downwardly through nipple 15 and screw-connects with a cupped element 20 which is constantly exposed to the fluid passing under pressure through nipple 15 from intake 3. In the present instance element 20 includes an annular flange 21 of substantial area which is seated, under normal operating conditions, against base portion 17 of the nipple by the constant upward pressure of a main compression spring 22. The power or tension of spring 22 may be adjusted by a set screw 23 engaged with a movable support 24 for the spring, and the set screw extends through the center of a screw-threaded plug or cap 25 detachably connected with the bottom part of body 2. The pressure of spring 22 may thus be changed at will from the outside without disconnecting or dismantling the valve parts.

Pressure element 20 is united to an annularly corrugated shell 26 of thin spring metal which is in turn united to a flat ring 27 of larger diameter to permit the said parts to be clamped removably within the inner end of the screw-threaded opening in the bottom of body 2. The corrugated shell or bellows permits the piston or plunger element 20 to respond sensitively to the pressure of the fluid and the springs, and when plug 25 is screwed tightly in place it bears against ring 27 which presses a washer or gasket 28 against a flat seating shoulder 29 within body 2, thereby sealing expansion chamber 5.

However, by removing plug 25 the complete pressure valve assembly may be readily removed from the body, including valve seat or nipple 15. This nipple has lateral openings or outlet ports 30 for the fluid, and when set screw 23 has been adjusted to place the main compression spring 22 under a desired tension the main or so-called expansion chamber 5 is open to or has communication with the pressure line. If the pressure in the line increases to such a degree or extent that the pressure of main spring 22 is offset, element 20 yields and moves downwardly, thereby carrying valve head 12 nearer to its seat on nipple 15 and reducing the pressure and flow of the fluid in corresponding degree. Therefore, assuming main valve A to be open, the fluid is delivered to outlet 4 and discharged at the drinking fountain nozzle without objectionable spurting or malformation of the drinking column or stream. After the water enters into the upper compartment 7 of body 8 it passes to outlet 4 by way of a side port 31 and thence by a vertical passage 32 within the outlet side of body 2. A small set screw or valve C, tapered at its inner end, permits independent regulation of the water delivered to outlet 4 and the drinking fountain, and when valve C is set a definite restriction is placed on the outflow and a definite back pressure also established within the chambered body itself when the main valve is opened.

A very compact device is produced by arranging the main valve seat 10 and the pressure valve seat or nipple 15 co-axially within body 2, and by extending a walled intake into the body itself beneath the main valve seat, because such an arrangement facilitates the manufacturing operations, and permits a separate main valve unit and a separate pressure valve unit to be readily inserted within and detachably connected to the upper and lower ends of the body, respectively. Therefore I consider that the main valve unit and the pressure valve unit shown and described herein, exemplify and teach that valve units of other form or type can be substituted for the ones shown without departing materially from the combination, broadly speaking, while the specific form of pressure valve and the mode of mounting and connecting it to the body as shown and described herein are also new and novel insofar as I am aware.

What I claim is:

1. A valve structure, comprising intake and discharge passages, an expansion chamber communicating through openings with said intake and discharge passages and valve means governing said communicating openings, said valve means including a pressure regulating unit arranged substantially within said expansion chamber and coupled with the valve governing the communicating opening between said intake passage and said intake chamber.

2. A valve structure, comprising a chambered body having intake and discharge chambers communicating through openings with an expansion chamber, a pressure regulating unit arranged substantially within said expansion chamber of said body including a valve seat nipple projected through said communicating opening between said intake chamber and said expansion passage and a valve member co-operating with said valve seat nipple, said valve seat nipple being slidably confined within said opening and yieldably seated against the wall of said body containing said opening.

3. A valve structure, comprising a chambered body, having a main valve seat, a main valve for said seat, an expansion chamber within said chambered body, a walled intake passage extending into the expansion chamber of said chambered body having an opening communicating with said expansion chamber, a pressure-regulating unit substantially confined within said expansion chamber including a nipple extending into said opening of said walled intake passage, a valve member extending through said nipple into said passage, and means for coupling said pressure-regulating unit and nipple to said body and support said unit within said expansion chamber.

4. A valve structure, comprising a chambered body having a main valve seat and an intake passage, a main valve for said seat, an expansion chamber within said chambered body, and a pressure regulating valve unit embodying pressure actuated means confined within said expansion chamber and valve means coupled with said pressure actuated means and projected into said intake passage for controlling same.

In testimony whereof I affix my signature.

HALSEY W. TAYLOR.